(12) United States Patent
Schunk

(10) Patent No.: US 8,248,064 B2
(45) Date of Patent: Aug. 21, 2012

(54) INDUCTIVE SPEED DETECTOR

(75) Inventor: Matthias Schunk, Hartenstein (DE)

(73) Assignee: Cherry GmbH, Auerbach/Opf. (DE)

( * ) Notice: Subject to any disclaimer, the term of this patent is extended or adjusted under 35 U.S.C. 154(b) by 666 days.

(21) Appl. No.: 12/154,940

(22) Filed: May 28, 2008

(65) Prior Publication Data

US 2009/0021243 A1  Jan. 22, 2009

(30) Foreign Application Priority Data

Jul. 19, 2007 (DE) .......................... 10 2007 033 745

(51) Int. Cl.
*G01B 7/14* (2006.01)

(52) U.S. Cl. .............. 324/207.25; 324/207.21; 324/173; 324/166

(58) Field of Classification Search ............. 324/207.25, 324/207.21, 166, 173
See application file for complete search history.

(56) References Cited

U.S. PATENT DOCUMENTS

| | | | |
|---|---|---|---|
| 4,162,153 A | 7/1979 | Spector | |
| 4,331,917 A * | 5/1982 | Render et al. | 324/166 |
| 4,355,364 A | 10/1982 | Gudat | |
| 4,574,237 A | 3/1986 | Hachtel et al. | |
| 4,947,116 A * | 8/1990 | Welcome et al. | 324/173 |
| 6,043,644 A | 3/2000 | De Coulon et al. | |
| 6,836,128 B2 * | 12/2004 | Palata | 324/655 |
| 7,372,253 B2 | 5/2008 | Biber et al. | |
| 2006/0104558 A1 | 5/2006 | Gallion et al. | |
| 2006/0225358 A1 | 10/2006 | Haag et al. | |

FOREIGN PATENT DOCUMENTS

| | | |
|---|---|---|
| DE | 28 47 522 | 5/1980 |
| DE | 29 39 643 | 4/1981 |
| DE | 43 41 405 | 6/1994 |
| DE | 44 31 640 | 4/1995 |
| DE | 44 45 378 | 6/1996 |
| DE | 100 11 820 | 9/2001 |
| DE | 101 14 858 | 10/2002 |
| DE | 101 30 572 | 1/2003 |
| DE | 10 2005 029 764 | 1/2007 |

* cited by examiner

*Primary Examiner* — Reena Aurora
(74) *Attorney, Agent, or Firm* — Jordan and Hamburg LLP

(57) ABSTRACT

A device for inductive speed detection includes two planar coils which are arranged offset at a given distance from a pulse wheel and in the rotational direction of the pulse wheel, and are each part of an oscillator, the oscillator frequency of which is evaluated.

20 Claims, 2 Drawing Sheets

INDUCTIVE SPEED DETECTOR

BACKGROUND OF THE INVENTION

The invention relates to a device for inductive detection of speed and rotational direction.

Such devices are known, for example, from DE 10 2005 029 764 A1. In a first embodiment thereof the sensor element is embodied as a Hall sensor element. Hall sensor elements are very suitable for detecting variations in a magnetic field, and are therefore frequently used for speed detection. Hall sensor elements are inexpensive to acquire and can also be used at temperatures of up to about 160° C.

Hall sensors are disadvantageous, however, in that they are sensitive to dirt particles. In the worst case, soiling can lead to the sensors failing entirely.

In accordance with DE 10 2005 029 764 A1, the sensor element can alternatively be embodied as a magneto-resistive (MR) sensor element. The sensor is inductive in another alternative embodiment. In principle, inductive sensor elements are also well suited for detecting variations in a magnetic field.

In the known inductive speed detectors, wound coils are used that, in addition to high material expense, are also associated with the definite disadvantage that they are, on average, several centimeters deep.

The following table lists a few publications that are representative of Hall sensors and inductive sensors that have been used in the past:

| Application number | Title | Patent holder | Image | Status | Pat. Family |
|---|---|---|---|---|---|
| DE4341405 | Arrangement for detecting the position of rotating shafts | AB Elektronik GmbH | ⓘ | Lapsed | DE design patent lapsed |
| DE4445378 | Method and device for detecting the angular position of a rotating shaft | AB Elektronik Gmbh | ⓘ | Lapsed | EP; JP; US; WO |
| DE10114858 | Crankshaft sensor IC | AB Elektronik GmbH | ⓘ | Lapsed | DE design patent registered and pending |
| DE2847522 | Inductive transducer and evaluation circuit for same | Robert Bosch GmbH | ⓘ | Lapsed | JP; FR |
| DE2939643 | Inductive speed or angle of rotation transducer | Robert Bosch GmbH | ⓘ | Lapsed | GB; FR; IT |
| DE3242109 | Device for detecting the speed of a rotating part | Robert Bosch GmbH | ⓘ | DE Lapsed | EP; JP; US all had to lapse |
| DE4431640 | Sensor arrangement for determining the speed of a moving component | Robert Bosch GmbH | ⓘ | Lapsed | — |

A digital inductive sensor for linear position determination, angle measurement, and speed measurement having tooth-shaped pulse wheels is known from the pamphlet "Digital Inductive Position, Speed, and Direction Sensor PO120", pages 1 through 3. The measurement coils described therein are flat and resistant to oil, water, dust, and in magnetic fields. According to the transformer principle, the sensor chip includes a transmitter coil and two receiver coils. The receiver coils are offset in the direction of movement of the pulse wheel (of the target). The possible distance between target and sensor chip is also limited in this arrangement.

The object of the invention is to overcome the problems of the prior art, i.e., to provide an arrangement for inductive speed detection that is not sensitive with respect to soiling by particles, that enables shallow installation depth, and that permits a great distance to the generator.

The tacho generator should also withstand high temperatures and high pressures such as, for example, is encountered in a transmission.

SUMMARY OF THE INVENTION

In accordance with an embodiment of the invention, the device comprises two planar coils for measuring speed. The two coils are arranged such that they are spatially offset in the direction of rotation. Detection by means of the coils occurs via movement of a so-called pulse wheel. The prerequisite for this pulse wheel is that it can periodically influence the inductive sensor. The structure of the pulse wheel can, for example, resemble that of a toothed wheel or it can be, for example, constructed like a lattice. The pulse wheel does not have to be coded to be able to detect the direction in which it rotates. What is determinant for this, is that the two planar coils are arranged spatially offset in the direction of rotation.

One of the two coils can be a part of a first oscillator and a second of the two coils can also be part of a second oscillator, the oscillator frequencies being determined in each of the first and second oscillators. Frequency evaluation is more precise than conventional voltage or current evaluation due to higher resolution.

In accordance with another embodiment of the invention, the pulse wheel is coded such that the individual teeth of the pulse wheel can be differentiated. For detecting speed, the absolute oscillation frequency is not evaluated (the base frequencies are in the MHz range, for instance about 20 MHz or about 400 MHz), but rather the changes in frequency when a pulse tooth passes by are detected. When the pulse wheel is coded, an evaluation circuit can then localize each individual tooth successively, i.e. can detect the rotational direction and/or the rough angular position from this individualization.

DETAILED DESCRIPTION OF THE INVENTION

Figure 1:
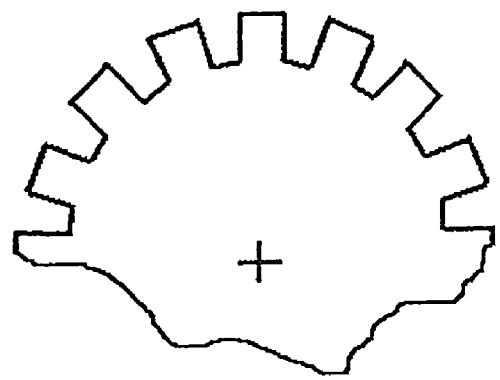
FIG. 1 is a partial side view of a pulse wheel resembling a toothed wheel.
Figure 2:
FIG. 2 is a partial end view of a pulse wheel embodied in a form of a lattice structure.
Figure 3:
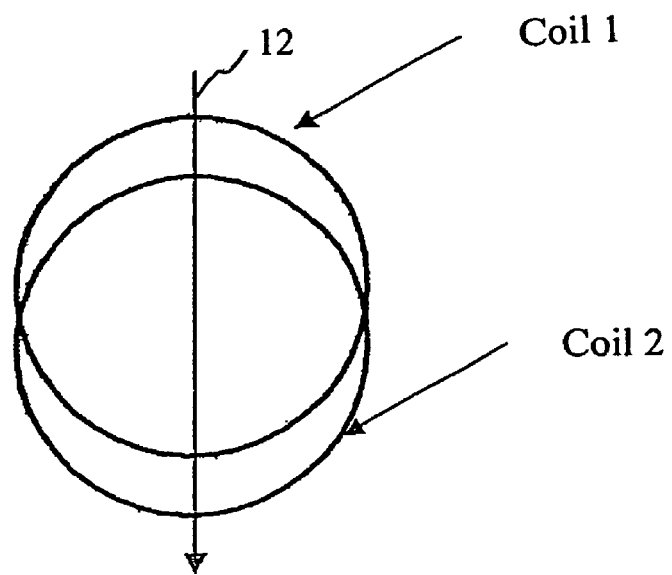
FIG. 3 is a schematic depiction of relative coil placement of a first coil and a second coil.

The basic solution in accordance with an embodiment of the invention comprises the use of two planar coils for measuring speed. The two coils are arranged such that they are spatially offset in the direction of rotation 12. Detection by means of the coils occurs via a moved component, referred to as a pulse wheel. The prerequisite for this pulse wheel is that it can periodically influence the inductive sensor. The structure of the pulse wheel can either resemble that of a toothed wheel (see, for example, FIG. 1) or it can be constructed like a lattice (see, for example, the schematic depiction in FIG. 2). The pulse wheel does not have to be coded to be able to detect the direction in which it rotates. What is determinant for this, is that the two planar coils are arranged spatially offset in the direction of rotation 12. FIG. 3 depicts this spatial offset for the two flat coils 1 and 2. The coil 1 can be a part of an oscillator and the coil 2 can also be part of another oscillator, in each of which the oscillator frequencies are determined. Frequency evaluation is more precise than conventional voltage or current evaluation due to higher resolution.

If, in a special case, the issue does not involve detecting the direction of rotation, a single planar coil can also be adequate for determining speed. All of the advantages that accrue from the oscillation frequency evaluation of the associated oscillator also apply in this case.

A large effective coil surface area is obtained using the special arrangement of the coils 1 and 2 shown, for example in FIG. 3 (or corresponding to a single planar coil). This is important in order to also be able to undertake precise evaluations, even when there is a great distance to the pulse wheel.

The coil 1 (and the coil 2, if any) are preferably printed on a printed circuit board, but can also be stamped, or can comprise curved wire, etc.

In order to prevent the two coils 1 and 2 from influencing one another, they are switched through a multiplexer, such that at all times current is flowing through only one coil and the other coil is highly resistive during this period. In the inventive speed sensor, the evaluation of frequency changes strongly contributes to supporting detection, even given great distances. Detection under these conditions represents a substantial advantage. With known arrangements in the past, it has only been possible to attain a distance not exceeding 4 to 5 mm between sensor and pulse wheel. With the inventive arrangement it is even possible to work at a distance of up to 10 mm.

By virtue of the great distance permitted, the pulse generator (pulse wheel) can be exchanged as desired within an application. In the prior art, there was the problem that when using smaller generator wheels (pulse wheels), the sensor did not continue to provide usable results due to the greater distance. Combining planar coils and frequency evaluation counteracts this disadvantage.

Figure 4:
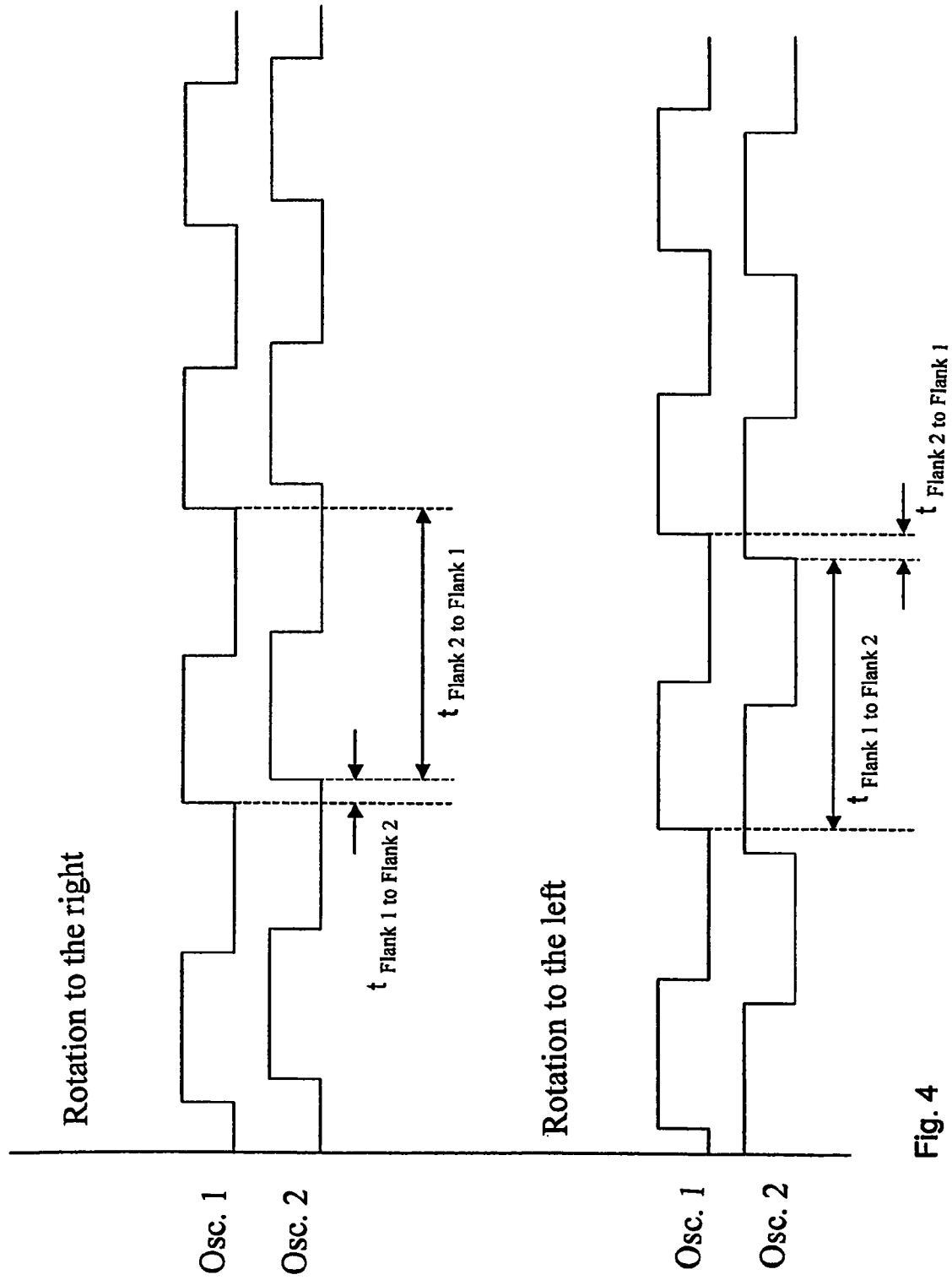
FIG. 4 is a graphical representation of the sequence of pulse flanks showing, respectively rotation to the right and rotation to the left.

Rotational direction detection is also provided in a particularly simple manner when the advancing of a tooth or lattice element (at least the passing of a pulse-originated segment of the wheel circumference) is first perceived as a pulse on one flat coil and then on the other flat coil. In FIG. 4 it is possible to see how the sequence of the pulse flanks reverses with the direction of rotation.

In the second solution in accordance with another embodiment of the invention, rather than providing this detection of the direction of rotation with nothing further, the detection can be supplemented in a manner alternative to the first solution, specifically if the pulse wheel is coded. Coding means that the individual teeth of the pulse wheel can be differentiated. Then, the use for detecting the direction of rotation is possible.

The following additional technical features apply for both solutions described above.

The pulse wheel does not have to be a magnetic actuator, but rather can be an electrically conductive eddy current damping element. If coded, each tooth or each interval between teeth, for instance, has different conductivity.

Furthermore, the so-called pulse wheel can resemble a toothed wheel or it can be constructed on its circumference like a periodic lattice.

It is a great advantage that the pulse wheel can be exchanged for a different, non-identical pulse wheel, because the importance of the spacing in the detection arrangement was reduced. The permissible assembly tolerances are therefore greater. The distance between planar coil and pulse wheel can be up to 10 mm.

The planar coils are advantageously printed on a printed circuit board, perhaps using multilayer engineering. However, flat coils can also alternatively be produced by punching from sheet or by bending wire.

For detecting speed, the absolute oscillation frequency is not evaluated (the base frequencies are in the MHz range, for instance about 20 MHz or about 400 MHz), but rather the changes in frequency when a pulse tooth passes by are detected. An example shall explain this below.

At room temperature (20 degrees Celsius), assume for the present example that the base frequency is 20.0 MHz. The pulse temporarily increases this oscillation frequency to 20.2 MHz; i.e., the pulse causes a short-term 0.2 MHz change in frequency (which can be detected easily and can be associated with one tooth).

Although the same experiment at a transmission temperature of 150 degrees Celsius results in an increased base frequency of 24.5 MHz, it provides a constant 0.2 MHz change in frequency to 24.7 MHz. Thus, by using the invention, it is possible to associate a constant change in frequency (i.e., a temperature-stable and distance-compensatable change in frequency) to each pulse-initiating element. Such pulses can be easily and reliably counted in the evaluation logic element.

When the pulse wheel is coded, the frequency-increasing pulses in the same sense are constant (that is, temperature-stable and distance-compensatable); they differ as well only from tooth to tooth in step shape or in their temporal change. The evaluation circuit can then also localize each individual tooth successively, i.e., can detect the rotational direction and/or the rough angular position from this individualization.

The invention claimed is:

1. A device for inductively detecting speed and rotational direction, comprising:
   a pulse wheel; and
   two planar flat coils being spatially offset and partially overlapping from one another in a rotational direction of said pulse wheel, and being positioned, respectively, at different given distances from said pulse wheel in a radial direction of said pulse wheel, each of said two planar flat coils serving as a part of a respective oscillator, an oscillator frequency of which is subject to evaluation, wherein for each one of the two planar coils, respective planes of said two planar coils have a normal direction perpendicular to said rotational direction of the pulse wheel.

2. A device according to claim 1, wherein said pulse wheel is not a magnetic actuator.

3. A device according to claim 1 or 2, wherein said pulse wheel is constructed periodically in a manner of a lattice.

4. A device according to claim 1 or 2, wherein said pulse wheel resembles a toothed wheel.

5. A device according to claim 1 or 2, wherein said pulse wheel is exchangeable.

6. A device according to claim 1 or 2, wherein said given distance between said planar coils and said pulse wheel is up to about 10 mm.

7. A device according to claim 1, wherein said planar coils are printed using multilayer engineering.

8. A device according to claim 1 or 2, wherein said planar coils include punched or bent wire.

9. A device according to claim 1 or 2, wherein the oscillation frequencies of said oscillators are in the range of a base frequency of about 20 MHz to about 400 MHz.

10. A device according to claim 1 or 2, wherein said planar coils are switched to said oscillator via a multiplexer.

11. A device for inductively detecting speed and rotational direction, comprising:
a pulse wheel rotatable in said rotational direction, said pulse wheel being coded for enabling said rotational direction detection; and
at least one planar flat coil being arranged at a given distance from said pulse wheel, said planar flat coil serving as a part of an oscillator, an oscillator frequency of which is subject to evaluation, wherein a direction normal to a plane of said at least one planar coil is perpendicular to said rotational direction of the pulse wheel.

12. A device according to claim 11, wherein said pulse wheel is not a magnetic actuator but rather is electrically conductive and comprises distinct pulse causing segments arranged along a circumference of the pulse wheel.

13. A device according to claim 11 or 12, wherein said pulse wheel is constructed periodically in a manner of a lattice.

14. A device according to claim 11 or 12, wherein said pulse wheel resembles a toothed wheel.

15. A device according to claim 11 or 12, wherein said pulse wheel is exchangeable.

16. A device according to claim 11 or 12, wherein said given distance between said planar coil and said pulse wheel is up to about 10 mm.

17. A device according to claim 11 or 12, wherein said planar coil is printed on a printed circuit board.

18. A device according to claim 11 or 12, wherein said planar coil is punched or bent wire.

19. A device according to claim 11 or 12, wherein the oscillation frequency of said oscillator is in the range of a base frequency of about 20 to about 400 MHz.

20. A device for inductively detecting speed and rotational direction, comprising:
a pulse wheel; and
two planar flat coils formed on a multilayer printed circuit board and being spatially offset and partially overlapping from one another in a rotational direction of said pulse wheel, and being positioned, respectively, at different given distances from said pulse wheel in a radial direction of said pulse wheel, each of said two planar flat coils serving as a part of a respective oscillator, an oscillator frequency of which is subject to evaluation.

* * * * *